United States Patent
Johnsen et al.

(10) Patent No.: US 7,602,712 B2
(45) Date of Patent: Oct. 13, 2009

(54) SWITCH METHOD AND APPARATUS WITH CUT-THROUGH ROUTING FOR USE IN A COMMUNICATIONS NETWORK

(75) Inventors: Bjorn Dag Johnsen, Oslo (NO); Hans Rygh, Oslo (NO); Morten Schanke, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 865 days.

(21) Appl. No.: 10/863,016

(22) Filed: Jun. 8, 2004

(65) Prior Publication Data

US 2005/0271073 A1 Dec. 8, 2005

(51) Int. Cl.
*G01R 31/08* (2006.01)

(52) U.S. Cl. ........................ 370/231; 370/392; 370/400; 370/428

(58) Field of Classification Search ................. 370/389, 370/392, 422, 428, 474, 351, 391, 396, 400, 370/401, 419, 429; 713/160–162, 168–171, 713/150; 726/2–4, 27, 30; 709/201, 238, 709/244
See application file for complete search history.

(56) References Cited

U.S. PATENT DOCUMENTS

| | | | | |
|---|---|---|---|---|
| 6,115,376 A * | 9/2000 | Sherer et al. | ................. | 370/389 |
| 6,289,015 B1 * | 9/2001 | Warner et al. | ............... | 370/392 |
| 6,570,884 B1 * | 5/2003 | Connery et al. | ............. | 370/419 |
| 6,718,392 B1 * | 4/2004 | Krause | ........................ | 709/238 |
| 6,839,794 B1 * | 1/2005 | Schober | ....................... | 710/316 |
| 6,851,059 B1 * | 2/2005 | Pfister et al. | ................... | 726/10 |
| 7,072,343 B1 * | 7/2006 | Waclawsky et al. | ..... | 370/395.21 |
| 7,103,626 B1 * | 9/2006 | Recio et al. | ................. | 709/201 |
| 7,113,995 B1 * | 9/2006 | Beukema et al. | ............ | 709/229 |
| 2002/0118692 A1 * | 8/2002 | Oberman et al. | ............ | 370/419 |
| 2004/0120254 A1 * | 6/2004 | Rider | ......................... | 370/231 |
| 2005/0138368 A1 * | 6/2005 | Sydir et al. | ................. | 713/161 |

OTHER PUBLICATIONS

"A Keyword Match Processor Architecture using Content Addressable Memory", Long Bu and John A. Chandy, GLSVLSI'04, Apr. 26-28, 2004, Boston, Massachusetts, ACM, p. 372-376.*

* cited by examiner

*Primary Examiner*—Jayanti K Patel
*Assistant Examiner*—Jung Park
(74) *Attorney, Agent, or Firm*—Park, Vaughan & Fleming LLP

(57) ABSTRACT

One embodiment of the invention provides a method of operating a switch with cut-through routing in a communications network. The method includes receiving a packet at a first port of the switch and determining a second port of the switch from which the received packet is to be forwarded out over the network. At least one authentication check is performed on the received packet. In general, the switch starts to forward the received packet from the second port prior to complete reception of the packet at the first port. However, this onward transmission is delayed until the authentication check has completed. This ensure that none of the received packet is forwarded from the second port if any authentication check fails.

15 Claims, 10 Drawing Sheets

SWITCH METHOD AND APPARATUS WITH CUT-THROUGH ROUTING FOR USE IN A COMMUNICATIONS NETWORK

RELATED APPLICATIONS

The present application is related to the following applications, all of which are filed on the same day and assigned to the same assignee as the present application:

"METHOD AND APPARATUS FOR VERIFYING SERVICE LEVEL IN A COMMUNICATIONS NETWORK", Inventors: Bjorn Dag Johnsen, Christopher Jackson, David Brean and Ola Torudbakken; U.S. patent application Ser. No: 10/863,019, filing date: 8 Jun. 2004;

"SWITCHING METHOD AND APPARATUS FOR USE IN A COMMUNICATIONS NETWORK", Inventors: Bjorn Dag Johnsen, Christopher Jackson, David Brean, Ola Torudbakken, Steinar Forsmo, Hans Rygh, Morten Schanke; U.S. patent application Ser. No: 10/862,970 filing date: 8 Jun. 2004. "METHOD AND APPARATUS FOR SOURCE AUTHENTICATION IN A COMMUNICATIONS NETWORK", Inventors: Bjorn Dag Johnsen, Christopher Jackson, David Brean, Ola Torudbakken; U.S. patent application Ser. No: 10/863,854, filing date: 8 Jun. 2004;

"CREDIT ANNOUNCEMENT", Inventors: Morten Schanke, Hans Rygh, Marius Hansen and Mathias Hoddevik; U.S. patent application Ser. No: 10/863,373, filing date: 8 Jun. 2004;

"ADAPTIVE CUT-THROUGH ALGORITHM", Inventors: Morten Schanke, Brian Manula and Magne Sandven; U.S. patent application Ser. No: 10/862,987, filing date: 8 Jun. 2004;

"COMMA DETECTION", Inventors: Magne Sandven, Morten Schanke and Brian Manula; U.S. patent application Ser. No: 10/863,374, fling date: 8 Jun. 2004;

"SERVICE LEVEL TO VIRTUAL LANE MAPPING", Inventors: Steinar Forsmo, Hans Rygh and Ola Torudbakken; U.S. patent application Ser. No: 10/862,985, filing date: 8 Jun. 2004;

"INPUT AND OUTPUT BUFFERING", Inventors: Hans Rygh, Morten Schanike, Ola Torudbakken and Steinar Forsmo; U.S. patent application Ser. No: 10/863,038, filing date: 8 Jun. 2004;

"CODEC IMPLEMENTATION FOR INFINIBAND", Inventors: Steinar Forsmo, Mathias Hoddevik and Magne Sandven; U.S. patent application Ser. No: 10/863,439, filing date: 8 Jun. 2004;

"VCRC CHECKING AND GENERATION", Inventors: Steinar Forsmo, Hans Rygh, Morten Schanke and Ola Torudbakken; U.S. patent application Ser. No: 10/863,013, filing date: 8 Jun. 2004;

"COMMUNITY SEPARATION ENFORCEMENT", Inventors: Ola Torudbakken and Bjorn Dag Johnsen; U.S. patent application Ser. No: 10/863,544, filing date: 8 Jun. 2004;

"STUMPING MECHANISM", Inventors: Brian Manula, Ali Bozkaya and Magne Sandven; U.S. Pat. No. 7,257,758, filed 8 Jun. 2004, issued 14 Aug. 2007.

The above-identified applications are all hereby incorporated by reference into the present application.

FIELD OF THE INVENTION

The present invention relates to communications networks, and in particular to switching in such networks using cut-through routing.

BACKGROUND OF THE INVENTION

The security of data communications networks is become increasingly important. As more and more sensitive data is transmitted over such networks, it is very important that data belonging to one user on the network does not somehow become exposed or visible to another user on the network. In addition, as organisations place ever greater reliance on the availability of networks for conducting their business and other operations, a network must be robust against hardware and software errors, component down-time, abnormal traffic conditions, and so on.

Some network problems may be innocent (i.e. non-malicious) in origin. For example, they may be caused by a hardware failure, a software bug, or some other weakness. In other cases, an adversary may try to cause network problems deliberately with malicious intent, such as for motives of terrorism, commercial gain, political persuasion, etc.. Depending upon the motives of the attack, the particular objective may be to obtain inappropriate access to data communications over the network, or to induce non-availability or some other non-functioning of the network. A malicious attack may exploit a known weakness in the network, and/or the attack may attempt to generate problems by the deliberate injection of errors, anomalous traffic, and so on.

It is therefore important for a network to be reliable and secure, and to be as resistant as possible against problems, whether deliberate or otherwise. In addition, it is also important for a network to be able to operate quickly and without delays.

SUMMARY OF THE INVENTION

Accordingly, one embodiment of the invention provides a method of operating a switch with cut-through routing in a communications network. The method includes receiving a packet at a first port of the switch and determining a second port of the switch from which the received packet is to be forwarded out over the network. In addition, one or more authentication checks are performed on the received packet. Forwarding of the received packet from the second port commences prior to complete reception of the packet at the first port (cut-through routing), but is subject to a delay. The delay is arranged to allow the authentication checks to all complete, and allows any invalid packets to be identified and discarded in their entirety, and so helps to ensure that none of the received packet is forwarded from the second port if any authentication check fails.

In one embodiment, the method includes extracting selected fields from the packet header. These fields can then be used to determine a second port of the switch from which the received packet is to be forwarded, and to perform the authentication checks on the received packet.

In one embodiment, the first port includes an input buffer for receiving the packet, and the second port includes an output buffer from which the received packet is to be forwarded out over the network. The delay in commencing may be implemented by requiring a predetermined amount of data to be present in the output buffer prior to commencing forwarding the received packet from the second port.

In another embodiment, an enable signal is generated when the authentication checks have completed. Onward forwarding of the packet is delayed until receipt of the enable signal.

The switch may support one or more of a variety of authentication checks, including validation of a partition key from the received packet, validation of a source identifier from the received packet, and validation of service level with respect to partition key.

In one embodiment, the method is implemented in an InfiniBand communications network, but could also be applied to other communications networks.

Another embodiment of the invention provides a switch for use in a communications network. The switch includes multiple ports attached to the network, and it is assumed that an incoming packet is received at a first port of the switch. The switch further includes a routing mechanism for determining a second port of the switch from which the received packet is to be forwarded out over the network, and at least one authentication mechanism for performing an authentication check on the received packet. The switch supports cut-through routing to commence forwarding the received packet from the second port prior to complete reception of the packet at the first port. Commencement of the forwarding is delayed until every authentication check has completed. Consequently, none of the received packet is forwarded from the second port if any of the authentication checks fail.

It will be appreciated that the switch embodiment of the invention will generally benefit from the same particular features as the method embodiment of the invention described above.

BRIEF DESCRIPTION OF THE DRAWINGS

Specific embodiments of the present invention will now be described by way of example only with reference to the accompanying figures in which.

DETAILED DESCRIPTION

1) The InfiniBand Architecture

The InfiniBand architecture provides a standard computer networking environment defined and administered by the InfiniBand Trade Association, which was founded by Compaq, Dell, Hewlett-Packard, IBM, Intel, Microsoft and Sun Microsystems (InfiniBand is a trademark of the InfiniBand Trade Association; other names are trademarks of their respective companies). The InfiniBand Architecture defines a System Area Network (SAN) for connecting multiple independent processor platforms (i.e. host processor nodes), I/O platforms and I/O devices. A full definition of the InfiniBand Architecture may be found in the InfiniBand Architecture Specification Volumes 1 and 2, available from the InfiniBand Trade Association (www.InfiniBandta.org), and which is hereby incorporated hereinto by reference.

An InfiniBand Architecture system area network (SAN) provides a communications and management infrastructure supporting both I/O and interprocessor communications for one or more computer systems. An InfiniBand Architecture system can range from a small server with one processor and a few I/O devices to a massively parallel supercomputer installation with hundreds of processors and thousands of I/O devices.

The InfiniBand Architecture defines a switched communications fabric allowing many devices to communicate concurrently with high bandwidth and low latency in a protected, remotely managed environment. An end node can communicate over multiple InfiniBand Architecture ports and can utilise multiple paths through the InfiniBand Architecture fabric. A multiplicity of InfiniBand Architecture ports and paths through the network are provided both for fault tolerance and for increased data transfer bandwidth.

Figure 1:
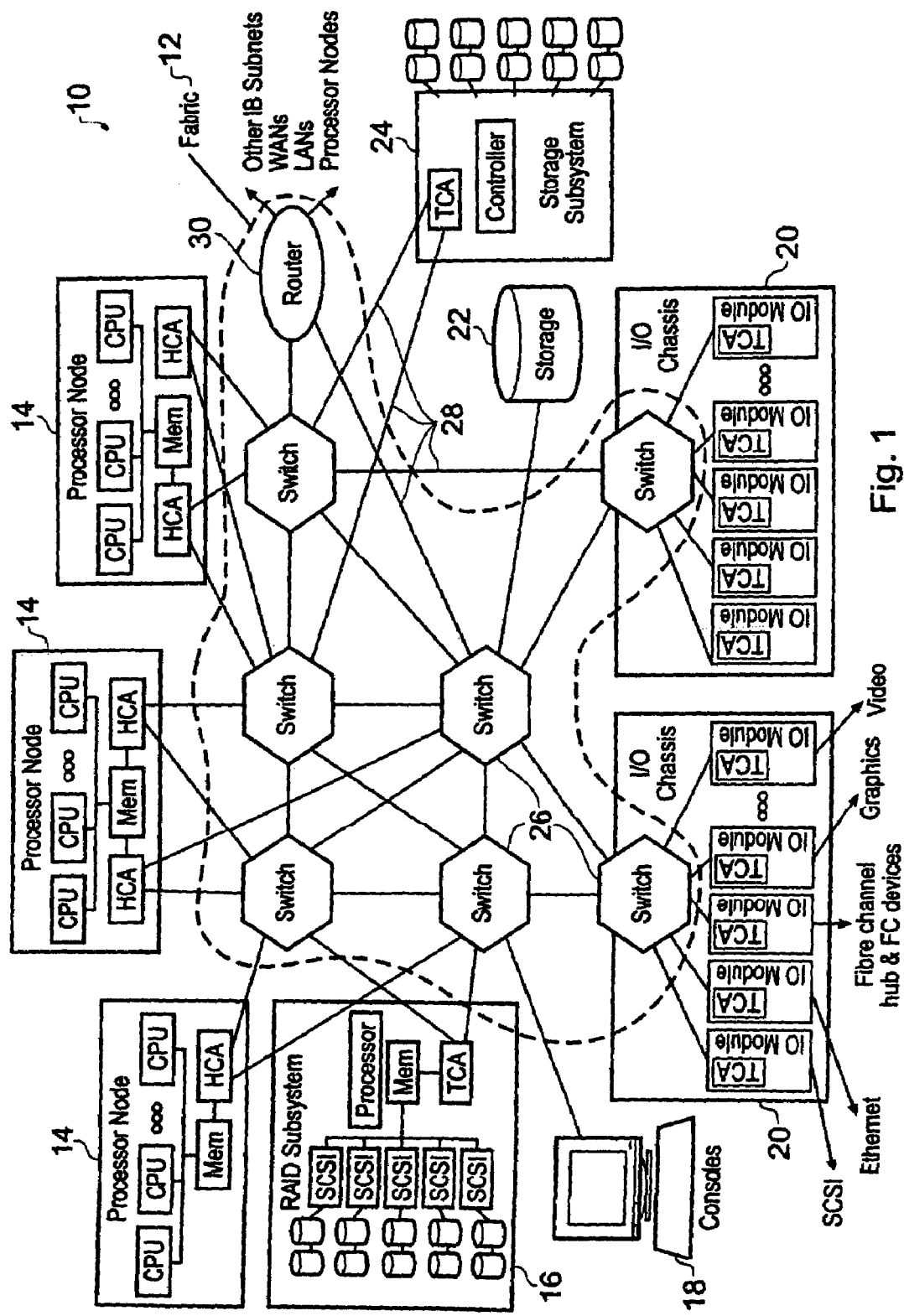
FIG. 1 is a schematic block diagram showing an example of interconnection of computing system elements via the InfiniBand networking architecture.

An example of an InfiniBand Architecture system area network is shown in FIG. 1. As can be seen from FIG. 1, the system area network 10 comprises an InfiniBand Architecture fabric (or subnet) 12 made up of cascaded switches and routers. The fabric 12 provides links between a number of processor nodes 14 and other nodes including a RAID subsystem 16, consoles 18, I/O chassis 20, storage 22 and a storage subsystem 24. The fabric 12 comprises a plurality of switches 26 with InfiniBand links 28 providing data connections between the switches 26 and between the nodes attached to the fabric 12. Also included in the fabric 12 is a router 30 for providing connections to and from other networks, which may be other InfiniBand Architecture subnets, non-InfiniBand Architecture LANs and WANs, and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, RAID subsystem 16, consoles 18, I/O chassis 20, storage 22 and storage subsystems 24 are known as end nodes 32.

Each endnode 32 includes a channel adapter, which may be a Host Channel Adapter (HCA) or a Target Channel Adapter (TCA). Host Channel Adapters are found in processor nodes 14, and Target Channel Adapters are found in I/O nodes 16, 18, 20, 22 and 24. Host Channel Adapters are configured to issue requests across the fabric 12, and Target Channel Adapters are configured to respond to such requests, for example by supplying requested data or storing supplied data.

Each channel adapter uses a queuing system based on Queue Pairs, one queue for send operations and one for receive operations. Each queue pair may therefore be considered to provide a virtual communication port for a channel adapter. Each channel adapter may have up to $2^{24}$ Queue Pairs, which may be assigned individually or in combination to handle communications involving different parts (or consumers) of the end node 32. For example, a processor node 16 may comprise a plurality of processors and each processor may have one or more individual Queue Pairs assigned to handle requests and responses flowing to and from that particular processor of the processor node via fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
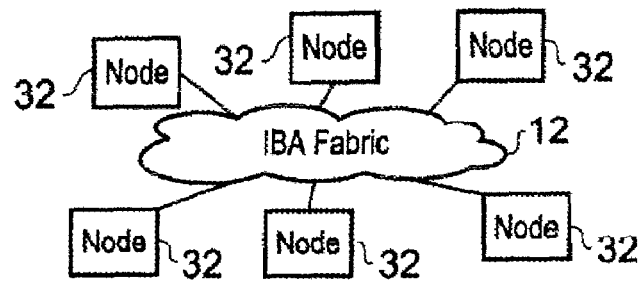
FIG. 2 is a schematic block diagram of a simplified arrangement of an InfiniBand Architecture system.
Figure 3:
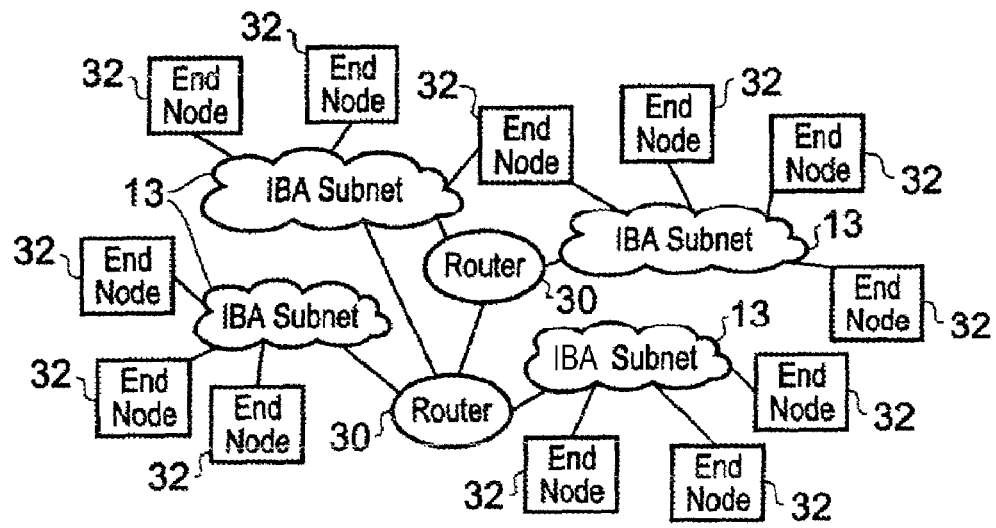
FIG. 3 is a schematic block diagram of another simplified arrangement of an InfiniBand Architecture system.
Figure 4:
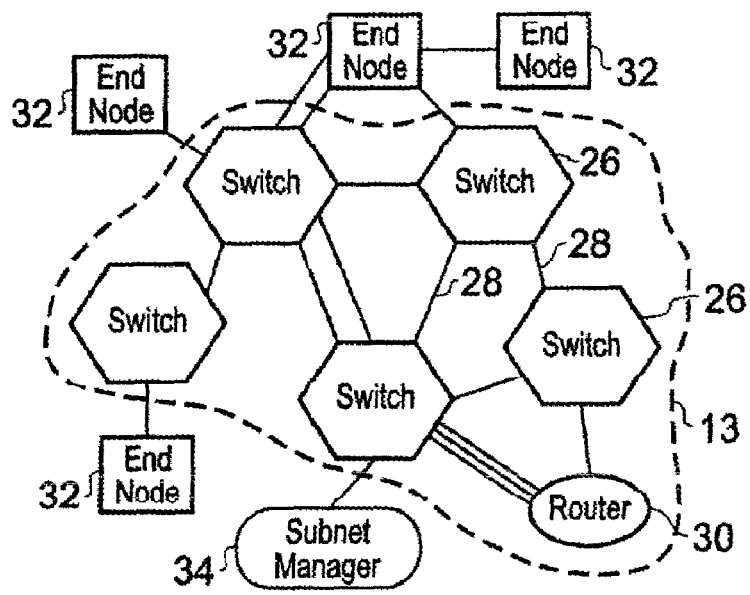
FIG. 4 is a schematic block diagram of a further simplified arrangement of an InfiniBand Architecture system.

Examples of possible InfiniBand Architecture topologies are shown in FIGS. 2, 3 and 4. FIG. 2 shows a high level simplified topology example where a number of end nodes 32 are interconnected by the fabric 12. An InfiniBand Architecture network may be subdivided into subnets 13 interconnected by routers 30 as illustrated in FIG. 3. Any particular end node 32 may be attached to a single subnet 13 or to multiple subnets 13. Shown in FIG. 4 is an example of the structure of a subnet 13. The subnet 13 comprises end nodes 32, switches 26, routers 30 and subnet managers 34 interconnected by links 28. Each end node 32 may attach to a single switch 26, multiple switches 26 and/or directly with each other. In the case of a direct connection between end nodes 32, the two or more directly linked end nodes form in effect an independent subnet with no connectivity to the remainder of the devices attached to the main subnet, and one of the interconnected end nodes functions as the subnet manager for that link.

Figure 5:
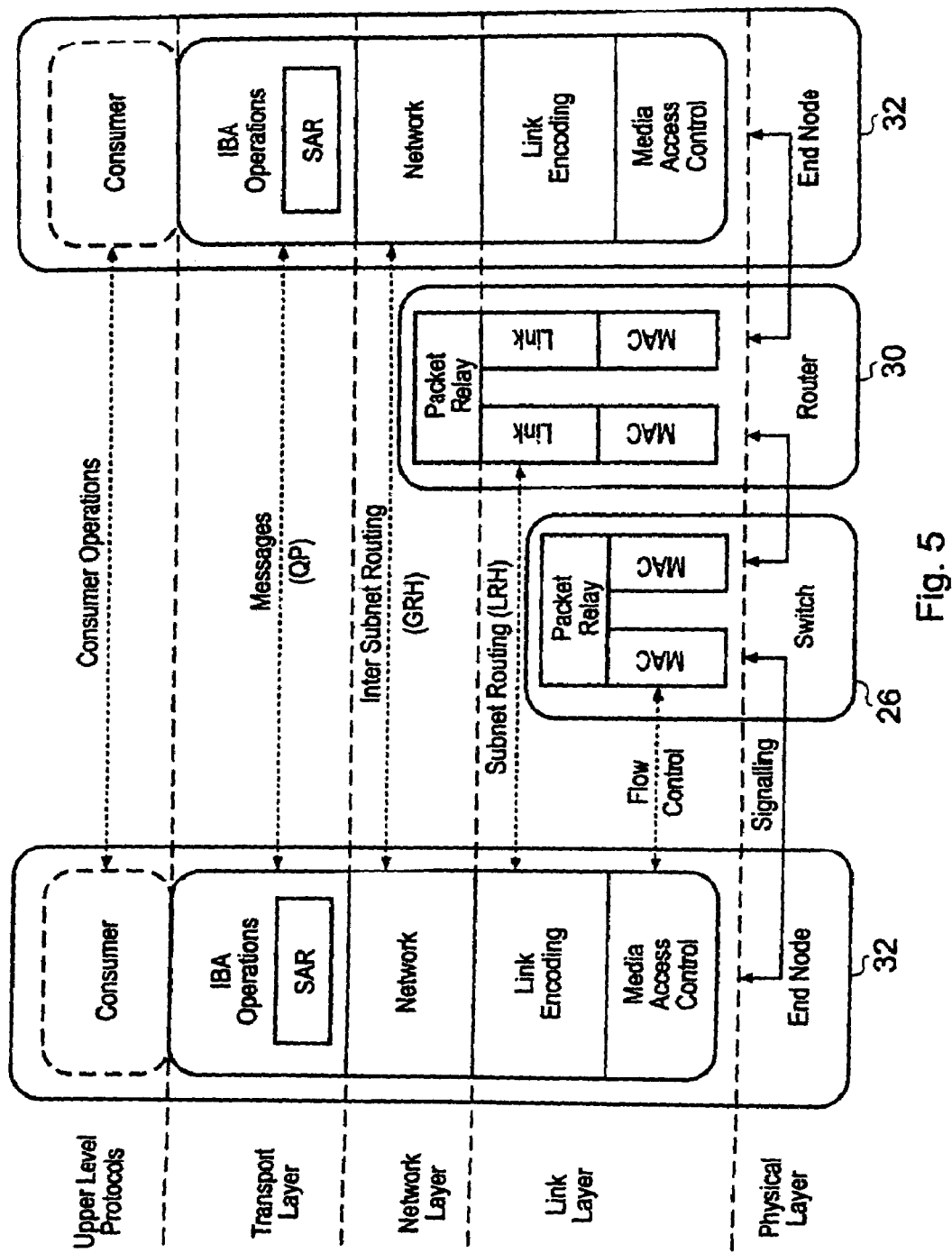
FIG. 5 is a schematic illustration of the layers of an InfiniBand Architecture system.

Referring now to FIG. 5, there is shown an illustration of the architecture layers of an InfiniBand Architecture system. Starting with the physical layer, this specifies how bits are placed onto the interconnections 28 and defines the symbols used for framing (i.e. start of packet and end of packet), data, and fill between packets (idles). It also specifies the signalling protocol as to what constitutes a validly formed packet (i.e. symbol encoding, proper alignment of framing symbols, no invalid or non-data symbols between start and end delimiters, no disparity errors, synchronisation method, etc.). The signalling protocol used by the InfiniBand Architecture utilises a differential signal. The interconnects 28 between nodes of an InfiniBand Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

Figure 6:
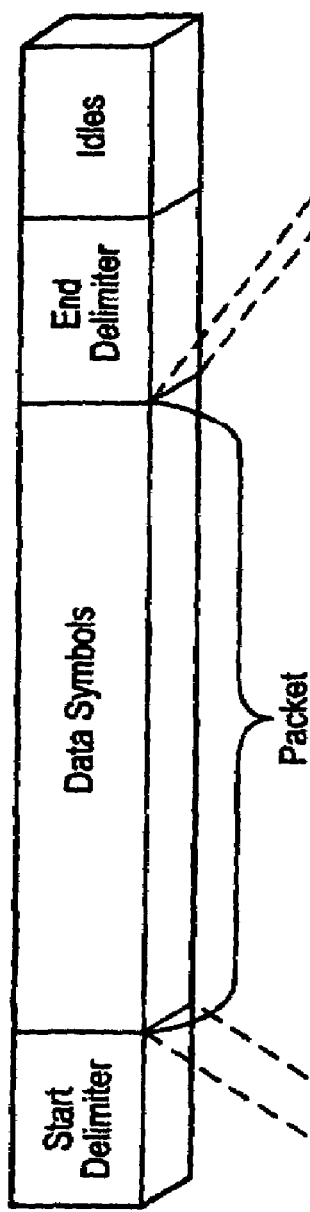
FIG. 6 shows schematically the structure of a message to be transmitted via an InfiniBand Architecture system.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
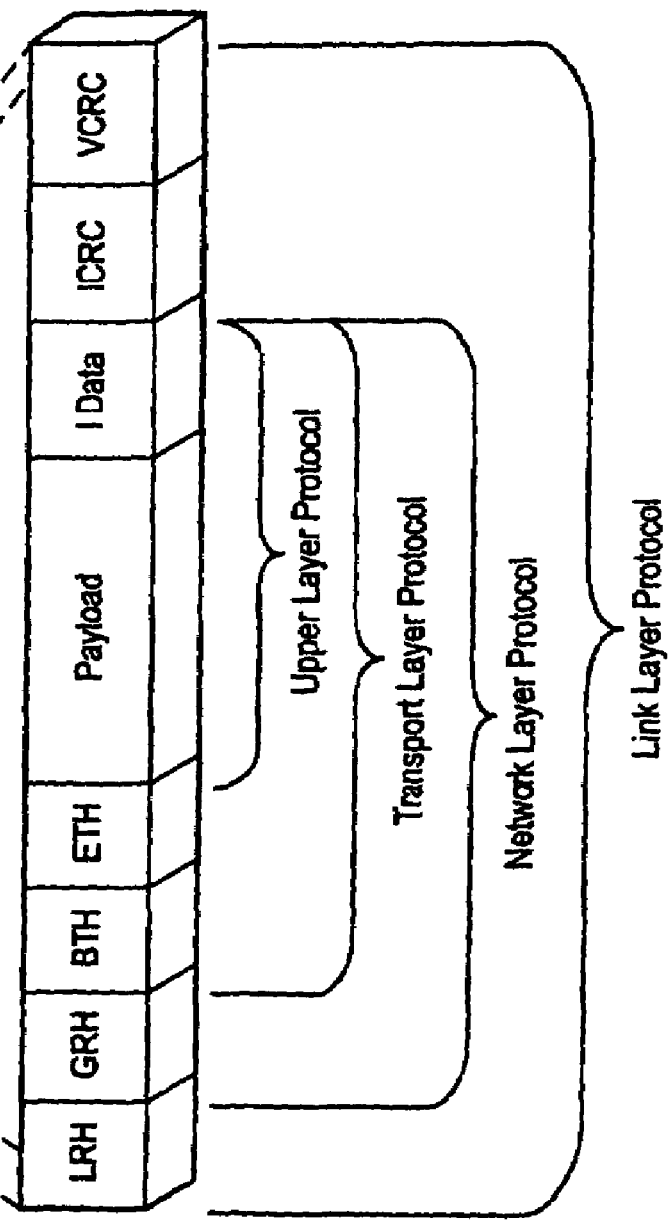
FIG. 7 shows schematically the format of a packet of the message of FIG. 6.

The data packet format is illustrated in FIG. 7. Packets may be one of two types, IBA (InfiniBand Architecture) Packets or RAW (non InfiniBand Architecture) Packets. IBA Packets have IBA defined transport headers, are routed on InfiniBand Architecture fabrics 12, and use native InfiniBand Architecture transport facilities. Raw Packets may be routed on IBA fabrics but do not contain InfiniBand Architecture transport headers. From an InfiniBand point of view, these packets contain only InfiniBand routing headers, payload and CRC. The InfiniBand Architecture does not define the processing of these packets above the link and network layers. These packets can be used to support non-InfiniBand Architecture transports (e.g. TCP/IP, IPX/SPX, NetBUI etc) over an InfiniBand fabric.

The link layer describes the packet format and protocols for packet operation, e.g. flow control and how packets are routed within a subnet between the source and the destination. Packets may be data packets that convey data between end nodes and comprise a number of different headers which may or may not be present. Alternatively, packets may be Link Management Packets, which are used to train and maintain link operation. These packets are used to negotiate operational parameters between the ports at each end of a link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sourcing data packets. The receiver is the consumer of the data packets. Each end of the link has a transmitter and a receiver. The InfiniBand Architecture utilises an "absolute" credit based flow control scheme, in which InfiniBand Architecture receivers provide a "credit limit". A credit limit is an indication of the total amount of data that a transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The InfiniBand Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the link layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The network layer, which is present only within routers 30 and end nodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the network and link layers operate together to deliver a packet to the desired destination.

The transport layer, which is present only within end nodes 32, delivers the packet to the proper Queue Pair within the channel adapter of the destination end node 32 and instructs that Queue Pair as to how the packet's data should be processed. The transport layer also has responsibility for segmenting a message into multiple packets when the message's data payload is greater than the maximum payload that can be carried by a single packet. The receiving Queue Pair then reassembles the data from the multiple packets at the destination end node 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver end node 32 may transmit an acknowledgement back to the originator end node to indicate whether all packets have been received successfully.

The upper level protocols are completely software based and may comprise any number of protocols used by various user consumers. The payload is the data carried by the packet and I Data is handling data associated with a work activity to be performed on the payload. Also present in the upper level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an end node 32.

Figure 8:
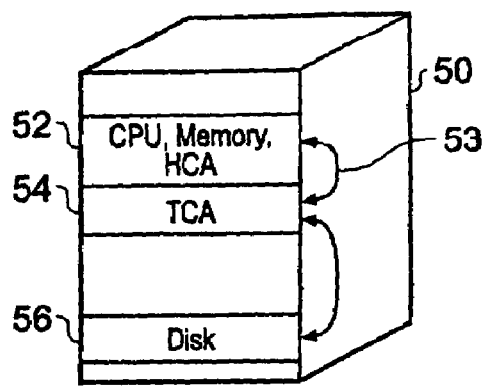
FIG. 8 is a schematic block diagram showing an arrangement where the InfiniBand Architecture is used to interconnect components within a computer system.
Figure 9:
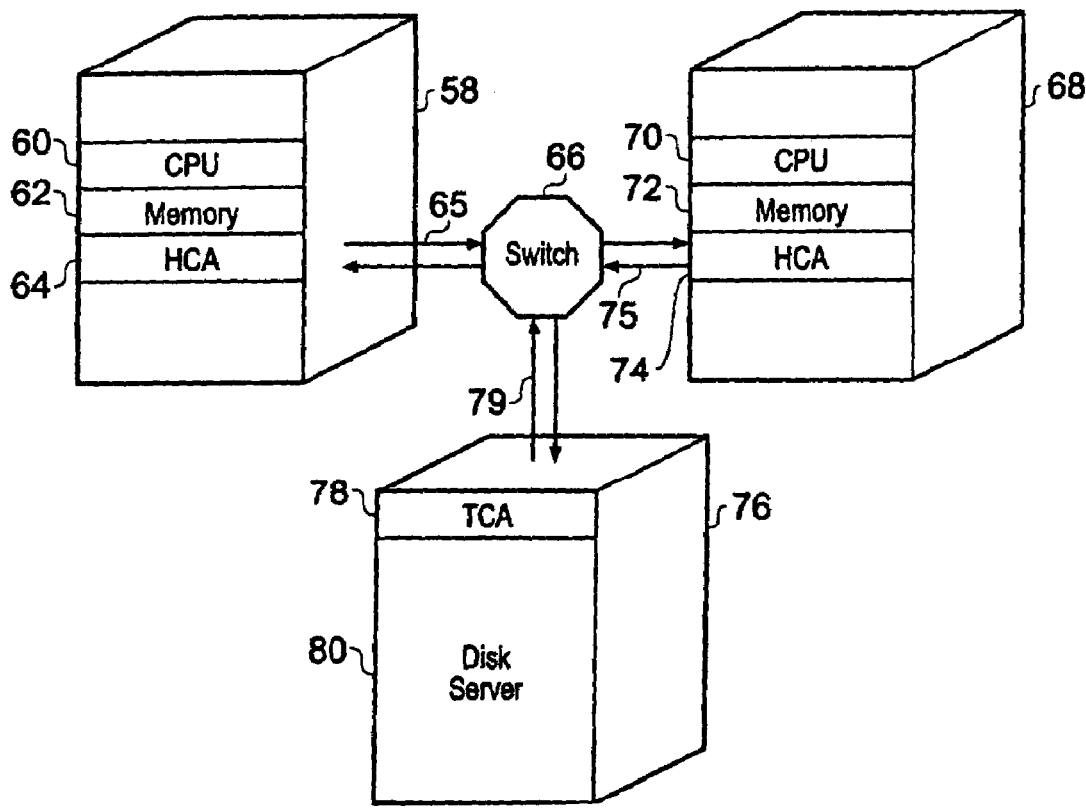
FIG. 9 is a schematic block diagram showing an arrangement where the InfiniBand Architecture is used as an interconnect between computer systems.

Examples of simple InfiniBand Architecture systems are shown in FIGS. 8 and 9. FIG. 8 shows an arrangement where the InfiniBand Architecture is used to interconnect components within a standard computer system rack 50. In this example, the CPU, memory and a Host Channel Adapter 52 are interconnected using conventional non-InfiniBand Architecture techniques. The Host Channel Adapter 52 of the CPU and memory communicate via an InfiniBand Architecture interconnect 53 with a Target Channel Adapter 54. The Target Channel Adapter 54 communicates with a disk drive unit 56 via a SCSI (Small Computer System Interface) connection. Thus the InfiniBand Architecture is configured in this example to facilitate communications between elements of the same computer system.

FIG. 9 shows an arrangement where the InfiniBand Architecture is used only as an interconnect between computers. In this example a first computer system is mounted in a rack 58 and comprises a CPU 60, memory 62 and a Host Channel Adapter 64 interconnected via non-InfiniBand Architecture techniques. Via the Host Channel adapter 64, the first computer system communicates to and from a switch 66 across interconnects 65. Also connected to the switch 66 is a second computer system mounted in a rack 68 and comprising a CPU 70, memory 72 and a Host Channel Adapter 74, which connects to the switch 66 via interconnects 75. Data storage for the first and second computer systems is provided by a disk server 80 mounted in a rack 76. The disk server 80 connects with a Target Channel Adapter 78 also mounted within the rack 76 by non-InfiniBand Architecture techniques. The Target Channel Adapter 78 connects to the switch 66 via interconnects 79. Thus the InfiniBand Architecture is configured in this example to facilitate communication between more than one distinct computer system. The techniques shown in FIGS. 8 and 9 may be employed in combination with one another, for example a computer system using the InfiniBand Architecture for internal communications may also be connected to other computer systems via a network based on the InfiniBand Architecture.

Figure 10:
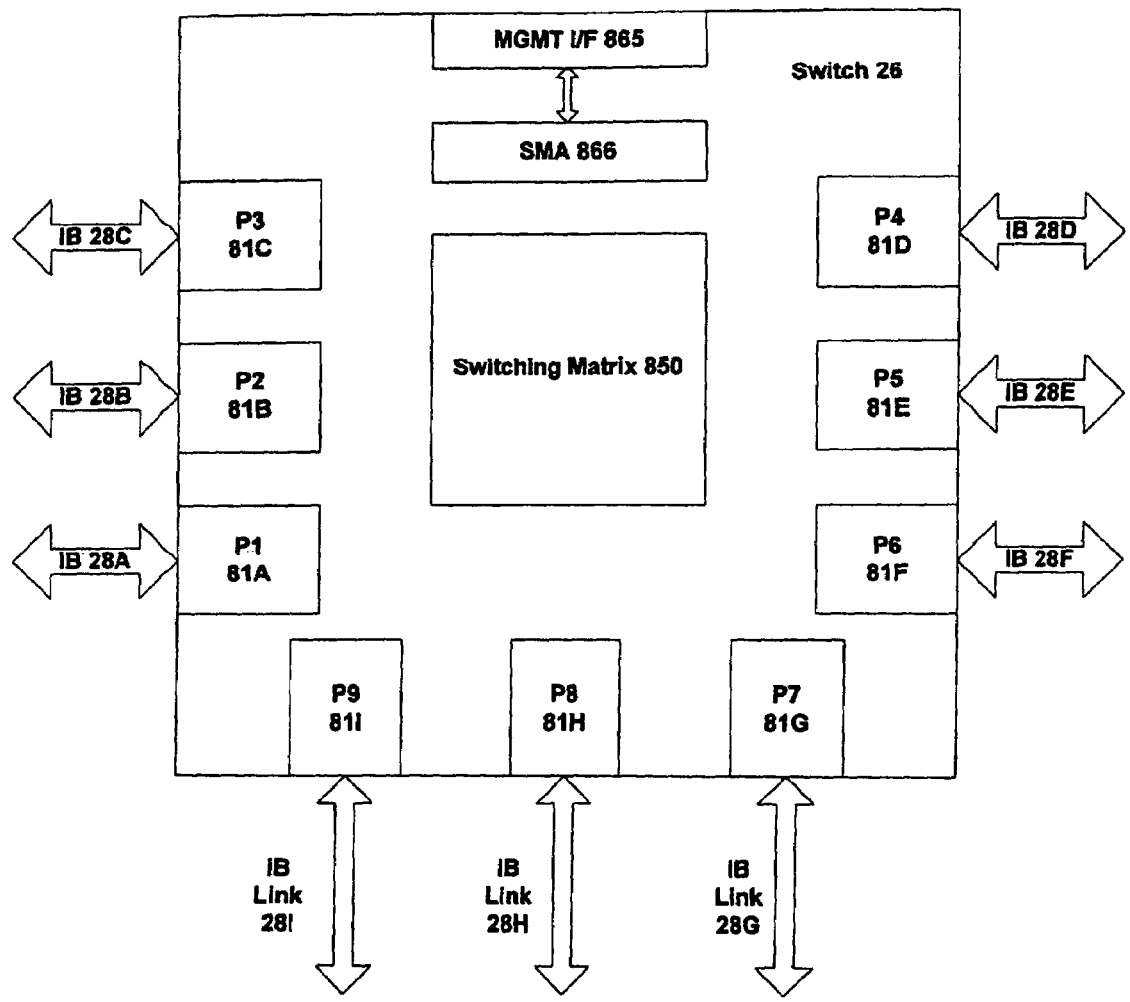
FIG. 10 is a schematic block diagram showing a snitch for use in an InfiniBand network in accordance with one embodiment of the invention.

FIG. 10 illustrates a switch 26 for use in fabric 12 in accordance with one embodiment of the invention. Switch 26 is implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the embodiment illustrated in FIG. 10, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding InfiniBand duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the InfiniBand Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An InfiniBand switch must support at least two virtual lanes on each link (i.e. data lane VL0 and management lane VL15). In one particular embodiment, switch 26 supports four virtual lanes for general data communication plus one virtual lane for management purposes (VL15).

In accordance with the InfiniBand Architecture, a packet can be specified as having one of sixteen different service levels (SLs). The service level for a particular packet is specified in the local route header (LRH), and remains constant as the packet transits an InfiniBand subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an InfiniBand network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The InfiniBand Architecture supports the concept of partitioning in order to provide logical isolation of components sharing the same subnet. All nodes included in a route from a source to a destination must share the same 16-bit partition key (P_Key), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the P_Key value within the incoming packet matches the indexed P_Key value in the P_Key table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the embodiment mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81 D and is to be forwarded on link 28A, then switching matrix 850 is responsible for transferring the data from port P4 81D to port P1 81A (corresponding to link 28A). It will be appreciated that while ports 81 are constrained by the InfiniBand standard (in order to ensure network connectivity), to some extent switching matrix 850 can be regarded as a more generic switching device, since it is internal to switch 26 and therefore shielded (at least in part) from other network devices.

The InfiniBand architecture supports two general modes of communication. The first of these is unicast or point-to-point, in which each data packet goes from a single source to a single destination. This translates into switching matrix 850 transferring a packet from one incoming port to one outgoing port. The other mode of communication in InfiniBand is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an InfiniBand network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the InfiniBand network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

Figure 11:
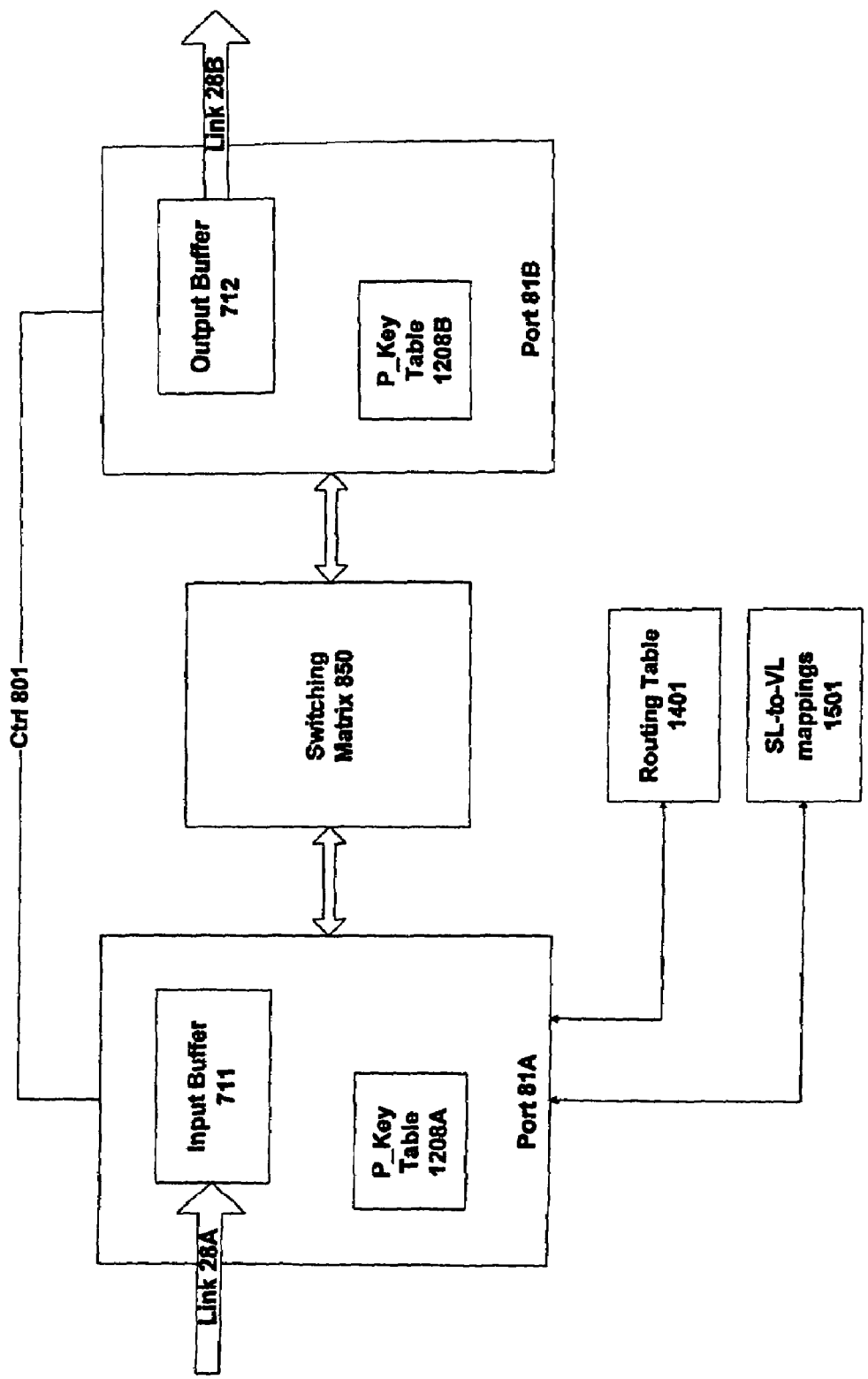
FIG. 11 is a schematic block diagram showing the forwarding of a packet through the switch of FIG. 10 in accordance with one embodiment of the invention.

FIG. 11 provides a schematic diagram of the routing of a packet through switch 26. An incoming packet is received at port 81A over link 28A into input buffer 711. It must now be determined how to forward this packet (assuming that the packet is not intended for port 0, i.e. the management interface, on the switch itself). This can be regarded as a two-step process using routing table 1401 and SL-to-VL mappings 1501. (Note that routing table 1401 and/or SL-to-VL mappings 1501 may be provided on a port-by-port basis, or may be maintained centrally within switch 26 for use by all ports).

Firstly, the destination identifier (DLID) is extracted from the header of the incoming packet, and used to access routing table 1401. The routing table maps DLIDs to output ports. This therefore allows the switch to determine the appropriate output port for the received packet. In addition, the service level (SL) is extracted from the header of the incoming packet, and used to access the set of SL-to-VL mappings 1501 (based on knowledge of the input and output ports for the packet). This allows the switch to determine the appropriate output virtual lane for the received packet.

Accordingly, the received packet is routed from the input buffer 711 of the receiving port 81A through the switching matrix 850 to an output buffer 712 of the transmitting port 81B as determined by the DLID of the packet header. The packet can now be transmitted out over link 28B on a virtual lane appropriate to the SL value of the packet header.

The receiving port 81A may include some scheduling facility (not shown in FIG. 11) to handle the transfer of incoming packets through the switch to the appropriate output ports. For example, an incoming packet may have to be stored temporarily in the input buffer 711 if the desired output buffer is currently occupied. Any such contention delay serves to increase latency through the switch. Note that the scheduling facility may be sensitive to (i.e. influenced by) the desired amount of buffering within switch 26 for any given packet. (Reasons for deliberately buffering at least a portion of an incoming packet within switch 26 are discussed in more detail below).

FIG. 11 further illustrates a control link 801 from the receiving port 81A to the transmitting port 81B. In one particular embodiment, the received packet is forwarded to all the other ports on the switch. However, only the specified transmitting port (i.e. port 81B) receives an enable signal over control link 801 that allows the packet to be stored into its output buffer 712. The remaining ports do not receive such an enable signal, and discard the forwarded packet.

Also shown within each port 81 in FIG. 11 is a partition key table 1208. The input port 81A extracts the partition key from the header of the received packet and checks that the partition key corresponds to a partition supported by the port. If this is the case, then the packet can be forwarded as described above. However, if this is not the case—i.e. the partition key in the incoming packet does not correspond to a partition supported by the input port—then the packet is discarded without onward transmission from switch 26. An analogous partition key check may also be made at the output port 81B. (In general checks at an output port are less important than checks at an input port, since they will normally relate to a fabric egress point, rather than to a fabric ingress port).

Figure 12:
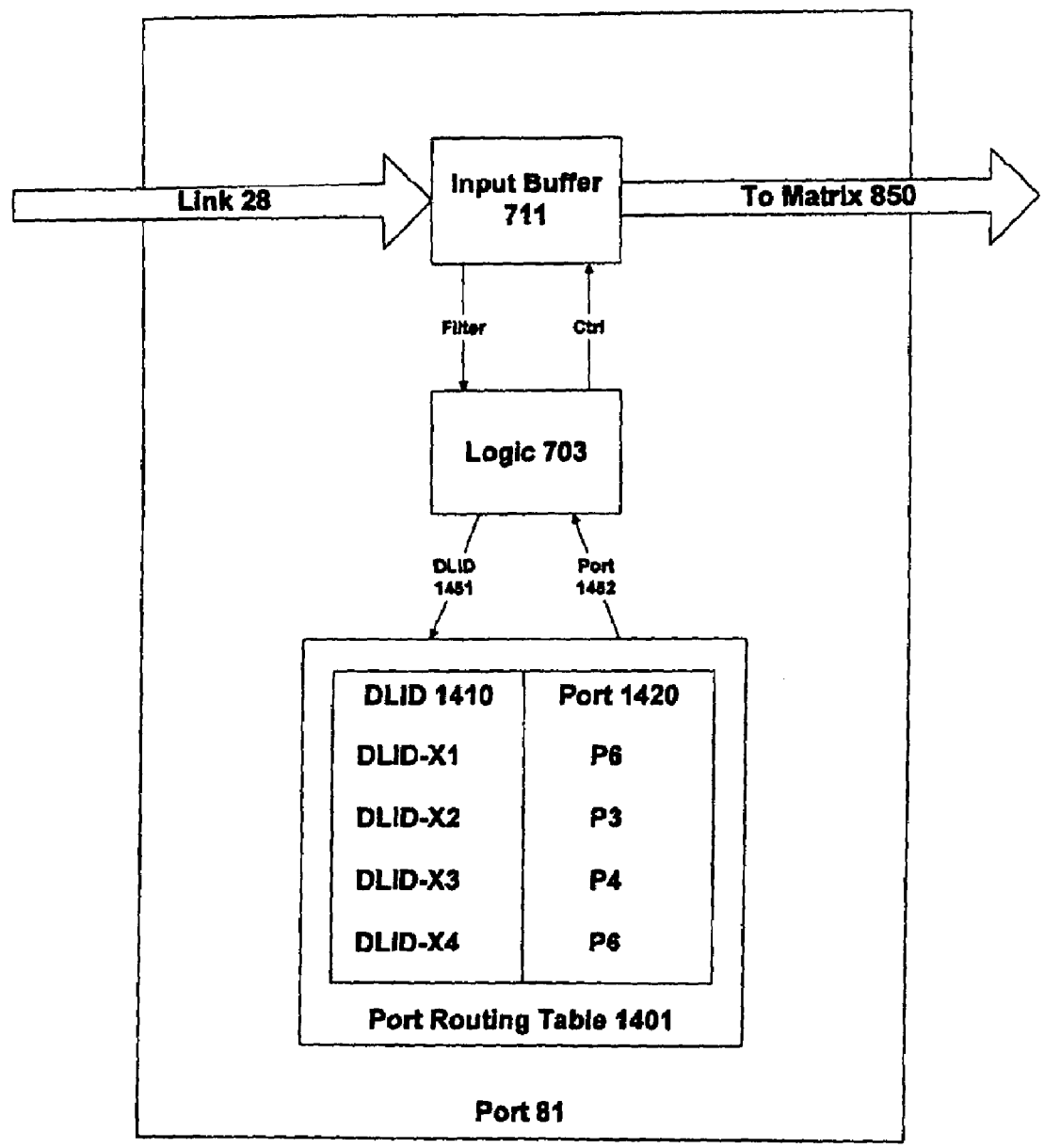
FIG. 12 is a schematic block diagram showing a port from the switch of FIG. 10 in accordance with one embodiment of the invention.

FIG. 12 illustrates an embodiment of the present invention in which each port 81 on switch 26 includes its own routing table 1401 in memory (e.g. RAM). This routing table 1401 may be made specific to the particular port 81 in which it is contained. The routing table 1401 can be regarded as having two columns, namely a first column 1410 representing DLID, and a second column 1420 representing output port. Routing table 1401 can be indexed by DLID in order to obtain a port number.

In operation, port 81 receives an incoming packet into input buffer 711 over link 28. The DLID field of the incoming packet is then extracted from the packet header by an appropriate masking or filtering of the packet and passed to logic 703. Logic component 703 uses the DLID value 1451 extracted from the incoming packet 701 to index into (or otherwise access) port routing table 1401. In particular, logic 703 receives back from port routing table 1401 the port number 1452 that corresponds to the DLID value 1451 extracted from the incoming packet 701. For example, in the particular configuration shown in FIG. 12, if the incoming DLID value 1451 equals DLID-X2, then the incoming packet is to be forwarded to Port 3 in the switch. Once logic 703 has determined the port 1452 to which incoming packet should be directed, it performs appropriate control operations to route the packet through the switching matrix 850 to the specified port for onward transmission of the packet from the switch.

Entries in the routing table 1401 are inserted via the management interface 865 of the switch 26 using information supplied by the subnet manager 34. The table can be updated via the management interface 865 in response to information describing the addition of new destinations, the removal of old destinations, and alterations to the network resulting in revised routings.

The use of per port-routing tables 1401 within switch 26 helps to reduce latency within the switch. Firstly, the routing table 1401 can be located adjacent the control logic for the port, thereby allowing very quick access. In addition, there is no possibility of contention delays caused by different ports all trying to access a shared routing table at the same time. In addition, if a routing table becomes unavailable at any time (e.g. because the routing information is being updated), then this does not impact all communications through the switch, but rather only communications through the one port that contains the particular routing table that is being updated. (Note that in some embodiments contention controls can be provided at the hardware level to allow a routing table to be updated without interruption in the use of the table for packet forwarding purposes).

In some embodiments, the routing tables 1401 within each port are copies of one another (i.e. all the routing tables are the same). In other embodiments however, the routing tables are customised to their associated port. For example, if a port is not included within a route to a given destination node, then the corresponding DLID can be omitted from the routing table for that port. One advantage of this is that it may allow the routing tables 1401 to be reduced in size, since they only need to accommodate a subset of routes through the switch (i.e. the subset of routes relevant to the particular port with which they are associated). In addition, it permits a much greater discrimination of packets within the network, including the ability to detect and remove certain aberrant packets (whether introduced into the network accidentally, for example due to some malfunction, or deliberately to disrupt proper operation of the network). Furthermore, it allows different path selections to be enforced on a per-port basis to the same end destination.

An important aspect of switch performance is latency. The larger the amount of buffering within switch 26, the greater the end-to-end delay across the network. For example, if data is being transmitted at a bit rate of 2.5 GHz, then each byte buffered within the switch increases latency by 3.2 ns. If a complete packet of size 2 Kbytes is buffered, then this introduces a latency of over 6.5 µs. The latency will be further increased if the link supports multiple virtual lanes (since this reduces the effective bit rate of the link), and/or if the packet has to pass through multiple switches in the network (since latency is cumulative through the network).

2) Cut-Through Routing

One known way to reduce latency is to perform cut-through routing, which does not store and forward complete packets. Rather, once the appropriate destination for an incoming packet is identified from the packet header, then onward transmission of the packet commences, despite the fact that the complete packet may not yet have been received at the switch.

In the context of FIG. 11, cut-through routing involves at least the initial portion of a packet header being received into input buffer 711. Once the DLID and SL values have been extracted from the received portion of the packet, the routing table 1401 and the SL-to-VL-mappings 1501 can be consulted to determine the appropriate output port. Accordingly, the incoming packet can now be directed from the input port 81A through switching matrix 850 to output port 81B, and onward transmission can commence from output port 81B, despite the fact that not all of the packet has yet arrived at switch 26. (As these remaining portions of the packet do arrive, they follow the same path through and out of the switch as the initial portions).

Note that the information needed to determine the onward routing of a packet (the DLID and SL values) occurs in the packet header, which comprises no more than 126 bytes, whereas the body of an InfiniBand packet may contain up to 4 Kbytes. Accordingly, cut-through routing greatly reduces the amount of a packet that is buffered in a switch (e.g. 126 bytes against 4 Kbytes). Indeed, there is no particular need to buffer the complete packet header, only the portion up to the DLID and SL values (since prior to receipt of these values, the output routing cannot be determined).

Although cut-through routing is highly effective at reducing latency in the network, it does have a couple of potential drawbacks. One of these is the possibility that the output buffer may become exhausted during onward transmission of the packet from the switch. Such exhaustion arises when there is a transmit space on the outgoing link, but the next portion of the packet to be transmitted is not yet available in the output buffer (usually because it has not yet, or only very recently, been received at the switch). This might be caused by different clock rates at different nodes in the network (resulting in a mismatch between packet reception rate and packet transmit rate). In these circumstances, one possibility is to transmit one or more idle characters on the link until the next packet data is ready for transmission. However, this does not make good use of network bandwidth. Accordingly, a system with cut-through routing may try to ensure that there is sufficient buffering of data prior to starting onward transmission to avoid buffer exhaustion. This then allows the intended onward link for the buffered data to be used for some other data transmission until the desired amount of buffering has been achieved, thereby helping to make the best use of network bandwidth.

In one particular embodiment of the invention, allowance is made for the fact that there may be different data rates on the incoming and outgoing links. For example, the incoming link may comprise a single 2.5 GHz lane, while the outgoing link may comprise multiple 2.5 GHz lanes. In this situation, onward transmission of the packet may be delayed until enough of the packet is buffered to avoid exhaustion of the output buffer during cut-through routing. The greater the data rate available on the outgoing link compared to the incoming link, the more buffering needs to be employed (since once onward transmission of the packet has commenced, the buffering will be depleted of outgoing data at a much greater rate than it is replenished with incoming data).

Another potential drawback with regard to cut-through routing concerns packet authentication. Thus as explained above, the P_Key of each incoming packet is validated in partition key table 1208. However, with cut-through routing the result of this validation may not be available until after the onward transmission of the packet has already started. Consequently, if the partition key validation fails, only the remaining portion of the packet can be discarded; the portion of the packet that has already been transmitted out from the switch is not affected. In other words, the invalid (truncated) packet will continue to traverse the network.

This situation does not conflict with the InfiniBand specification, since the invalid packet will still be discarded at its final destination due to partition key failure. However, transmitting the invalid packet through the network to the final destination wastes network bandwidth, and so reduces performance and capacity for other traffic on the network. In addition, the truncated packets will cause downstream nodes to perform further exception handling, thereby wasting processing resources at these other nodes.

Note that the presence of an invalid packet on the network may be caused accidentally, such as by the failure of a piece of hardware or a software bug. Alternatively, the invalid packet may be introduced deliberately by an adversary trying to disrupt the network for some reason. In either case, it is desirable that the network should be as robust as possible against invalid packets, so that they do not degrade the network for legitimate traffic.

Figure 13:
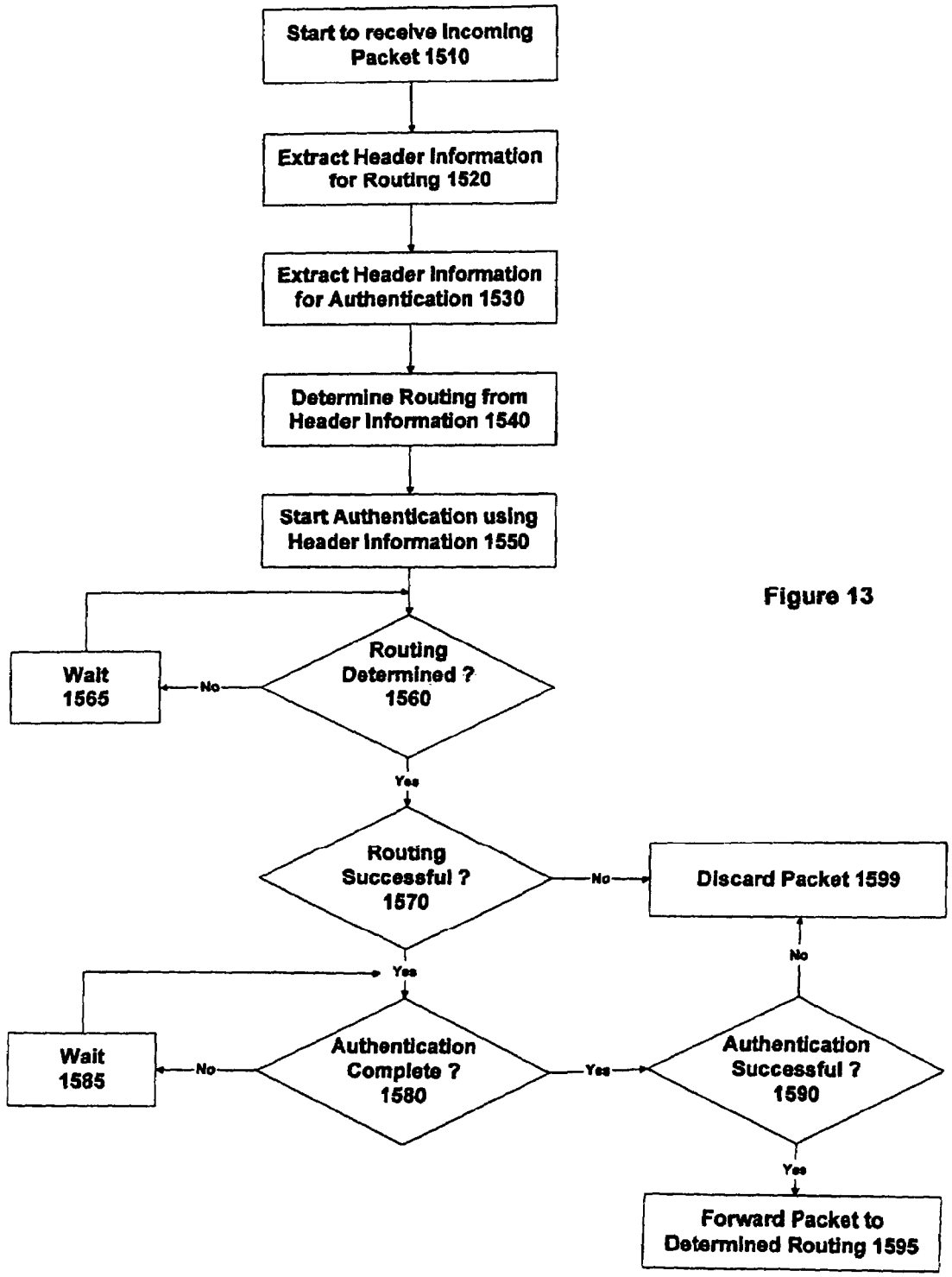
FIG. 13 is a flowchart depicting forwarding a packet through a switch in accordance with one embodiment of the invention.

The above situation is addressed by the flowchart of FIG. 13. Processing commences in the flowchart by a packet starting to arrive at a port 81A of a switch (1510). The packet header starts to arrive first. Various fields are extracted from the packet header to determine where to route the packet (1520) and to perform authentication (authorisation) of the packet (1530). For example, in an InfiniBand implementation, the fields extracted to perform the routing are the DLID value and the SL value, while the authentication may be performed on the basis of the P_Key value (as described above). Note that additional fields may be utilised for authentication checks, as discussed in more detail below. It will be appreciated that the various fields may be extracted all at the same time (if input buffer 711 has sufficient capacity), or accessed in any appropriate order—normally the order in which the various fields are received into input buffer 711 (which depends in turn on the predefined structure of the packet header).

As soon as the relevant fields have been obtained, the onward routing of the packet can be determined (1540), and any authentication checks can be started (1550). Again, it will be appreciated that the order of these operations will generally depend upon the availability of the relevant data, and may not exactly match that shown in FIG. 13. For example, it may be that the onward routing can start to be determined from extracted routing information prior to receipt (and extraction) of information needed for a particular authorisation check.

In an InfiniBand network, the onward routing can start to be determined once the DLID field is available (it also needs the SL field to complete, as described above). The authentication check can be started once the P_Key value is available. If any other authentication checks are to be performed, they can be started once the relevant fields have been extracted from the packet header.

Note that in general, if multiple authentication checks are to be performed, these will be executed in parallel. As will become apparent below, this helps to minimise latency through the switch. However, in some implementations there may be design reasons why certain authentication checks are performed sequentially (e.g. limited processing power at a port).

Similarly, the authentication checks may be performed in parallel with the routing determination, or sequentially. As a general rule, priority is given to completing the routing determination (compared to authentication), thereby allowing the appropriate output port to be selected as part of the cut-through routing (although this is again dependent upon the structure of the packet header).

It is now determined whether the route determination has completed (1560); if not, processing waits (1565) until this has occurred. A check is made to see whether or not the (completed) routing determination was successful (1570). If not, then the received packet is discarded without forwarding (1599). This may cause some error notification to be raised (e.g. to the subnet manager 34). Note that a routing failure may occur for example if there is no VL mapping in the switch corresponding to the SL value in the received packet for the port from which the packet is to be transmitted.

Assuming however that the routing is successful, the system now waits until the authentication checks are complete (1580, 1585). If the authentication is unsuccessful (1590), then the packet is discarded (1599). Again, this may cause some error notification to be raised. On the other hand, if the authentication is successful, then the packet can be forwarded from the relevant output port (1595). Note that such forwarding does not occur until all the authentication checks are complete (i.e. operation 1580). Accordingly, there is no possibility of forwarding (a portion of) a packet that is later found to be invalid. On the other hand, once the authentication check(s) is/are complete, then forwarding of the packet can start at operation 1595 without waiting for the entire packet to arrive. In other words, cut-through routing to reduce latency is still supported, but without the risk of disrupting the network by forwarding invalid packets.

It will be appreciated that if there are multiple authentication checks, then as long as they are all successful, the wait operation 1585 is until all the checks have completed. However, if any of the authentication checks fails, then processing can proceed directly to operation 1599 (discarding packet), since it is immediately known that the packet is invalid, without waiting for the result of any other pending authentication checks. (The results of any such other checks may still be of interest for network management purposes, but they do not impact the decision at operation 1590 not to forward the packet).

It is also possible that the results of one or more authentication checks become available prior to the routing being determined. Any authentication checks that complete successfully prior to determination of the routing do not impact the operations described above. In other words, after the routing has been successfully determined (operations 1560, 1570), the status of the authentication check(s) is assessed (operation 1580). If the authentication check(s) completed early (i.e. prior to route determination), then there is no need to wait (at operation 1585) for this assessment. On the other hand, if any authentication check fails prior to determination of the routing, we can progress directly to operation 1599 (discarding packet) without having to wait for the routing to be determined, since it is now known that the packet is not to be forwarded from the switch.

In some other cases, the authentication checks may depend upon the routing determination (i.e. the authentication check is path-sensitive). In such a situation, it may be necessary to wait for the routing determination to complete at operation 1560 prior to performing the authentication at operation 1550.

It will be appreciated that the approach of FIG. 13 introduces a delay into the cut-through routing. This delay is correlated or matched to (i.e. dependent upon) the timing of the authentication checks, and is sufficient to allow these checks to complete, thereby ensuring that no portion of an unauthorised packet is forwarded from the switch. On the other hand, the cut-through routing will generally proceed as soon as possible after the authentication checks have completed, in order to minimise latency through the switch.

In some circumstances, there may be a separate delay imposed on the cut-through routing independent of the authentication checks, for example in relation to the timing or speed matching issues discussed above. In this case, the total delay applied to the cut-through routing will correspond to whichever is the largest of these separate delays.

One further potential source of delay in switch 26 is due to contention between packets when the traffic rate through the switch becomes large (approaches the maximum capacity of the switch). It will be appreciated that unlike a deliberate delay for authentication (or speed matching), a contention delay is something that arises because of (unpredictable) traffic conditions. It is possible therefore that contention within the switch may lead to enough buffering to ensure completion of the desired authentication check(s). However, this cannot be relied upon in general, since any contention delay should disappear (go towards zero) in low traffic conditions.

In general, there are two possible configurations regarding the wait at operation 1585 of FIG. 13. In one configuration, the timing of the authentication checks is deterministic. In other words, it is known that such checking will require a certain number of machine operations or clock cycles (this could be regarded as synchronous operation). For example, consider the P_Key authentication check in the embodiment of FIG. 11. The P_Key table 1208 can be implemented using content addressable memory (CAM). A partition key authentication is performed by providing the P_Key value extracted from the incoming packet header to the CAM, and determining whether or not a match is obtained.

Since the number of operations and hence the time period needed to complete such an authentication check is known in advance, the amount of buffering corresponding to this time period can be determined. Accordingly, switch 26 can be configured to ensure that cut-through routing does not occur (i.e. onward transmission of the packet does not commence) until at least this predetermined amount of the packet is buffered into switch 26. Note that this buffering can be performed in input buffer 711 or output buffer 712 as appropriate (or in any desired combination of these two). In this approach the delay setting is implicit, given the required amount of buffering. In other words, a minimum amount of buffering is specified to ensure that the authentication checks complete prior to onward transmission of the packet, and hence no invalid packets are forwarded from the switch. In some circumstances, the amount of buffering employed may be greater than this minimum. Although this will increase latency, it may be needed for other reasons—e.g. the timing issues discussed above. (The amount of buffering here reflects the amount of data that is to be buffered, rather than the physical size of the buffers per se; the input/output buffers must clearly be large enough to accommodate the desired amount of buffering).

The second possible configuration could be regarded as asynchronous or non-deterministic. For example, consider that the partition key table storing each supported partition key for the port is implemented in conventional memory (rather than content addressable memory), and the partition key check is performed by accessing and checking each table entry in turn. Since the number of partition keys in the table is variable, it is not known in advance how long this check will take to complete. Accordingly, the receiving port 81A may send a specific enable signal (e.g. over control link 801 or any other suitable connection) to the transmitting port 81 B to indicate when the authentication checks have completed, and thereby to allow onward transmission of the packet to commence. It will be appreciated that the enable signal can be implemented in any appropriate manner, for example, by discontinuing a disable signal when any authentication checks have completed, by setting a status flag when the authentication checks have completed, etc.

(Note that a deterministic approach could also in fact be taken with this second implementation of the P_Key table. This is because the P_Key table will generally have a maximum capacity, and the minimum amount of buffering could be arranged to reflect the time taken to check a full P_Key table. In addition, it might also be possible to adjust the minimum amount of buffering to reflect the current level of occupancy of the P_Key table, given that this is relatively stable).

Although the above embodiments have utilised partition key checking as an authentication check, various other forms of checking may also be implemented. For example, in one embodiment, the subnet manager 34 specifies one or more service levels for use by each partition supported by a port. This information is then stored in conjunction with the P_Key table 1208. In other words, once the P_Key value from a packet has been used to identify a P_Key entry in the P_Key table 1208, this entry can then be used to access (either in the same table or another related table) the service level(s) allocated to that partition. The authentication check then fails if the SL value in the received packet does not correspond to one of the allocated service levels.

In another embodiment, the SL value may be correlated against the DLID value. For example, routing table 1401 might be used not only to store the output port for a given DLID, but also the set of acceptable SL values for the given DLID. The authentication of an incoming packet would then fail if the SL value in the packet did not correspond to an acceptable SL value as specified in the routing table for that particular DLID.

Figure 14:
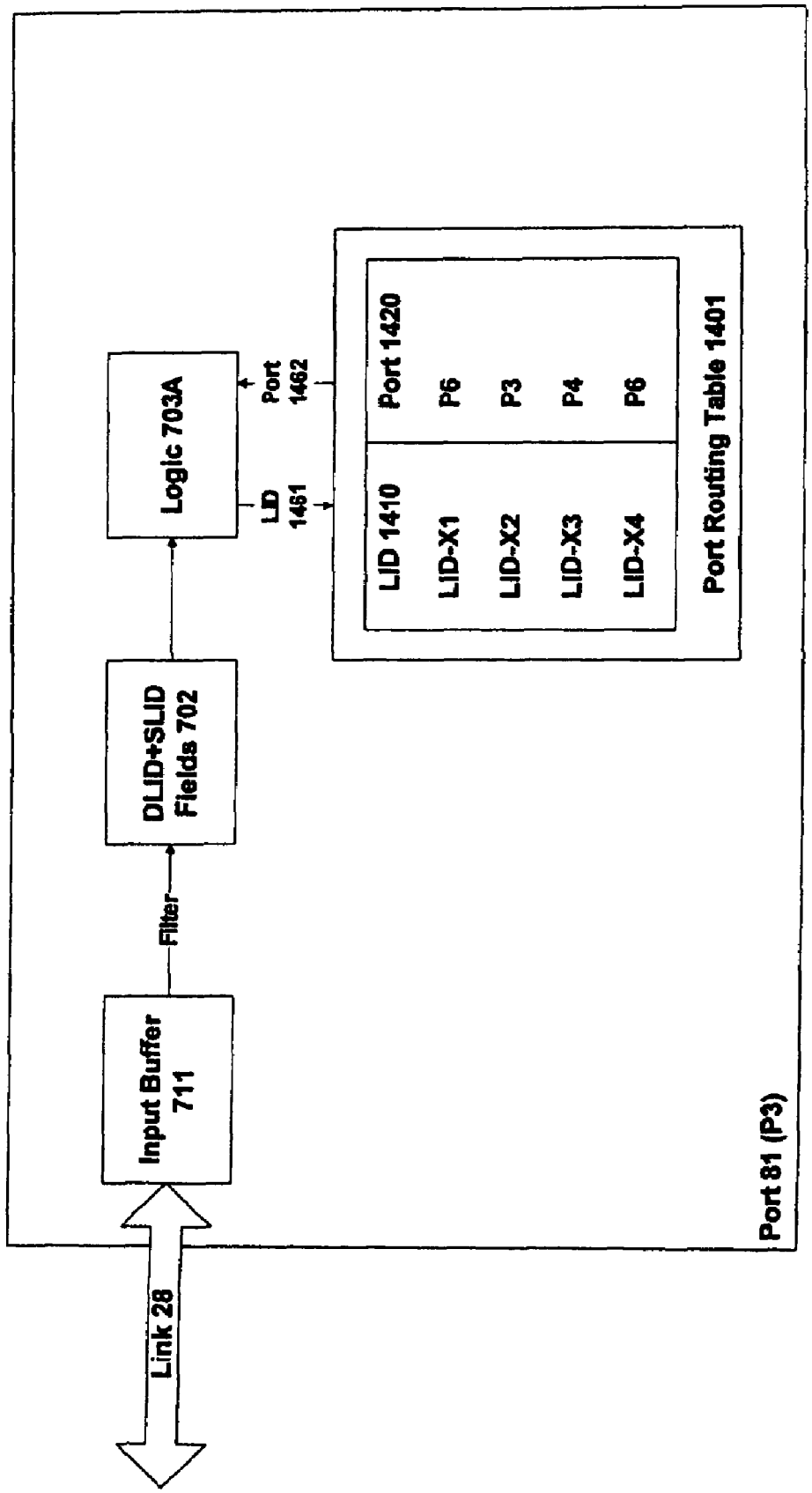
FIG. 14 is a schematic block diagram showing a port from the switch of FIG. 10 in accordance with another embodiment of the invention.

FIG. 14 illustrates another embodiment, in which the routing table 1401 is not only used for determining how to forward a packet, but also for verifying the SLID of an incoming packet. In this embodiment, an incoming packet is received into input buffer 711 and the SLID and DLID fields 702 are extracted by any suitable mechanism (e.g. masking, filtering, and so on). Logic 703A within port 81 now uses the extracted SLID and DLID fields to access port routing table 1401.

Conceptually, for any given port 81, LID space can be divided into two portions. The first corresponds to LIDs for nodes on the external (link) side of the port. The second corresponds to LIDs for nodes on the internal (switch) side of the port. It will be appreciated that an external LID represents a valid SLID, but not a valid DLID, while an internal LID represents a valid DLID, but not a valid SLID (for that particular port).

Accordingly, the LID values 1410 in port routing table 1401 can cover both the internal and external ranges of LID values. Each LID value 1410 has a corresponding port value 1420. Associated with the external LID values are the port numbers for onward transmission, as in the routing table of FIGS. 11 and 12. Associated with the internal LID values (i.e. with LIDs corresponding to an acceptable SLID) is the port number for the port itself, in other words the port that owns routing table 1401 (since the same port cannot be a legal point of both ingress and egress for a packet).

Routing table 1401 can therefore be used for two different tasks in port 81. The first represents a determination of the port to which a particular incoming packet 701 should be forwarded. In this case, a look-up is performed based on the value of DLID in the incoming packet. In addition, routing table 1401 will also be consulted when the SLID is to be verified, in which case the look-up is performed based on the value of SLID in the incoming packet.

When the DLID lookup is performed for routing purposes, then an acceptable result is the port number for any port other than the port that owns table 1401. Conversely, for SLID authentication, the only acceptable result is the port number corresponding to the port that owns table 1401. This then reflects the split of LID space between external values (for SLID verification) and internal values (for DLID routing). If a DLID lookup does return the port number corresponding to the port that owns table 1401, this represents an error, i.e. a failed routing, and the packet is discarded (corresponding to operation 1599 in FIG. 13). Likewise, if an SLID lookup does not return the port number corresponding to the port that owns table 1401, this also represents an error, and so implies failure of the SLID authentication. Again, such failure will cause the packet to be discarded, and may also cause an error notification to be raised.

In the particular example shown in FIG. 14, it is assumed that port 81 corresponds to port P3. In this case, only the LID range identified as LID-X2 in table 1401 would represent a valid SLID, while LID ranges LID-X1, LID-X3, and LID-X4 would all represent invalid SLIDs. Conversely, LID-X2 would represent an invalid DLID, but any of the other LID ranges in table 1401 would represent valid DLIDs.

It will be appreciated that any given embodiment may support one or more of the various possible authentication checks described above.

One embodiment of the invention described herein is provided as a computer program product, which may comprise program instructions stored on a removable storage medium, for example an optical (CD ROM, DVD, etc), semiconductor (e.g. flash memory) or magnetic (floppy disk, tape, etc) device. Such a medium can then be introduced into a computer system, such as a server, a client, a smart card, a network device (e.g. a switch) etc., in order to transfer the program instructions to the system. Alternatively, the program instructions may be transferred to the computer system by download via a transmission signal medium over a network, for example, a local area network (LAN), the Internet, and so on. The transferred program instructions are often stored on a hard disk or other non-volatile storage of a computer system, and loaded for use into random access memory (RAM) for execution by a system processor.

In conclusion, a variety of particular embodiments have been described in detail herein, but it will be appreciated that this is by way of exemplification only. The skilled person will be aware of many further potential modifications and adaptations that fall within the scope of the claims and their equivalents.

The invention claimed is:

1. A method of operating a switch with cut-through routing in a communications network comprising:
receiving a packet at a first port of the switch, wherein the first port comprises an input buffer for receiving the packet;
determining a second port of the switch from which the received packet is to be forwarded out over the network, wherein the second port supports a higher data rate than the first port, and wherein the second port comprises an output buffer to buffer a respective packet which is to be transmitted at the higher data rate, thereby preventing transmission exhaustion;
performing one or more authentication checks on the received packet by checking a partition key for the packet against a partition key table implemented in content addressable memory (CAM), thereby ensuring a deterministic delay for the authentication check;
applying a deterministic delay to cut-through routing of the packet by buffering the packet in the input buffer, or the output buffer, or both, wherein the delay is the larger of the time required to perform the authentication and the time required to buffer the packet sufficiently to avoid transmission exhaustion on the second port; and
commencing forwarding the received packet from the second port after the delay and prior to complete reception of the packet at the first port.

2. The method of claim 1, further comprising generating a enable signal to mark the end of said delay when said one or more authentication checks have completed.

3. The method of claim 1, wherein said one or more authentication checks comprises a validation of a partition key from the received packet.

4. The method of claim 1, wherein said one or more authentication checks comprises a validation of a source identifier from the received packet.

5. The method of claim 1, wherein said one or more authentication checks comprises a validation of service level with respect to partition key.

6. The method of claim 1, further comprising extracting selected fields from the packet header in order to determine a second port of the switch from which the received packet is to be forwarded and to perform said one or more authentication checks on the received packet.

7. The method of claim 1, wherein said communications network is a InfiniBand network.

8. A switch for use in a communications network comprising:
multiple ports, wherein an incoming packet is received at a first port, wherein the first port comprises an input buffer for receiving the packet;
a routing mechanism operable to determine a second port of the switch from which the received packet is to be forwarded out over the network, wherein the second port supports a higher data rate than the first port, and wherein the second port comprises an output buffer to buffer a respective packet which is to be transmitted at the higher data rate, thereby preventing transmission exhaustion;
an authentication mechanism operable to perform one or more authentication checks on the received packet by checking a partition key for the packet against a partition key table implemented in content addressable memory (CAM), thereby ensuring a deterministic delay for the authentication check; and
a delaying mechanism operable to apply a deterministic delay to cut-through routing of the packet by buffering the packet in the input buffer, or the output buffer, or both, wherein the delay is the larger of the time required to perform the authentication and the time required to buffer the packet sufficiently to avoid transmission exhaustion on the second port;
wherein said switch supports cut-through routing to commence forwarding the received packet from the second port after the delay and prior to complete reception of the packet at the first port.

9. The switch of claim 8, wherein an enable signal to mark the end of said delay is generated when said one or more authentication checks have all completed.

10. The switch of claim 8, wherein said one or more authentication checks comprises a validation of a partition key from the received packet.

11. The switch of claim 8, wherein said one or more authentication checks comprises a validation of a source identifier from the received packet.

12. The switch of claim 8, wherein said one or more authentication checks comprises a validation of service level with respect to partition key.

13. The switch of claim 8, wherein selected fields are extracted from the packet header in order to determine a second port of the switch from which the received packet is to be forwarded and to perform said one or more authentication checks on the received packet.

14. The switch of claim 8, wherein said communications network is an InfiniBand network.

15. A computer-readable medium encoded with a computer program which contains instructions that when loaded into a computer cause the computer to perform the method of:
receiving a packet at a first port of a switch, wherein the first port comprises an input buffer for receiving the packet;
determining a second port of the switch from which the received packet is to be forwarded out over a network, wherein the second port supports a higher data rate than the first port, and wherein the second port comprises an output buffer to buffer a respective packet which is to be transmitted at the higher data rate, thereby preventing transmission exhaustion;
performing one or more authentication checks on the received packet by checking a partition key for the packet against a partition key table implemented in content addressable memory (CAM), thereby ensuring a deterministic delay for the authentication check;
applying a deterministic delay to cut-through routing of the packet by buffering the packet in the input buffer, or the output buffer, or both, wherein the delay is the larger of the time required to perform the authentication and the time required to buffer the packet sufficiently to avoid transmission exhaustion on the second port; and
commencing forwarding the received packet from the second port after the delay and prior to complete reception of the packet at the first port.

* * * * *

UNITED STATES PATENT AND TRADEMARK OFFICE
CERTIFICATE OF CORRECTION

PATENT NO. : 7,602,712 B2  Page 1 of 1
APPLICATION NO. : 10/863016
DATED : October 13, 2009
INVENTOR(S) : Johnsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1157 days.

Signed and Sealed this

Fifth Day of October, 2010

David J. Kappos
*Director of the United States Patent and Trademark Office*